Nov. 22, 1949     R. J. ROBERT     2,488,740
METHOD AND DEVICE FOR STUDYING ELECTRICAL NETWORKS
Filed March 16, 1945     2 Sheets-Sheet 1

INVENTOR
ROGER JACQUES ROBERT
ATTORNEY

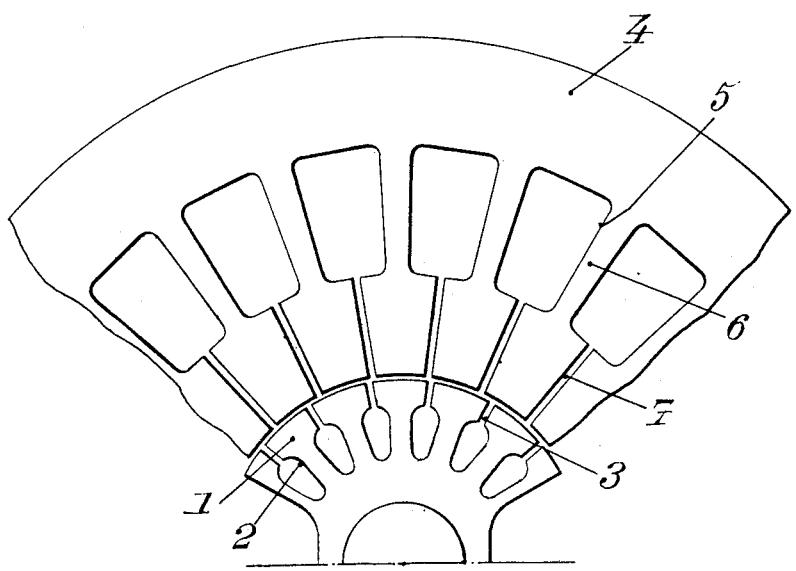
Fig. II

Patented Nov. 22, 1949

2,488,740

UNITED STATES PATENT OFFICE 2,488,740

METHOD AND DEVICE FOR STUDYING ELECTRICAL NETWORKS

Roger Jacques Robert, Paris, France, assignor to Société Union D'Electricite S. A., Paris, France, a society of France Application March 16, 1945, Serial No. 583,124
In France December 2, 1943

Section 1, Public Law 690, August 8, 1946
Patent expires December 2, 1963

24 Claims. (Cl. 171—97)

The present invention relates to methods and apparatus for the study of stability and other characteristics of electric machines and electric energy distribution systems or networks including such machines. It should consequently be well understood that the invention applies as well to the study of the stability of rotary machines and network elements as to the study of the stability of the network taken as a whole.

The object of the present invention is to permit of conducting a study of this kind with a higher accuracy and more rapidity than with the known methods used up to now, such for instance as the step by step method and the midget network method.

For this purpose I make use of a system, called "micro-system" or "micro-network," devised in such manner as to be, both under normal working conditions and under transitory conditions, an accurate electro-mechanical reproduction of the machines, elements or units to be studied. This implies bringing into evidence the laws, both of electrical similitude and of mechanical similitude, that must be complied with and providing means for complying with these laws. Once this micro-system has been obtained, all measurements, experiments, recordings as may be desired are carried out and from these can be deduced by similitude, the corresponding results concerning the big system (to be studied) or the elements thereof.

According to a feature of my invention, I provide means for modifying or adjusting the time constant of a circuit of the micro-system which consist in introducing into this circuit an external energy E, of the form $k.I$ and placing this energy under control of a low inertia and high amplification regulator, this amplification being for instance such that said regulator acts efficiently under the influence of an electromotive force little different from zero, for instance of the form $$v = (E - kI)$$

or $$v = \frac{E - kI}{p}$$

According to another feature of my invention, in order to obtain a reproduction on a reduced scale of machines or elements of an electric system, I make use of the above mentioned means for giving the reduced machines time constants equal to those of the corresponding machines or elements of the big system, or at least time constants in a given ratio to those of the corresponding machines or elements of the big system.

Other features of the present invention will result from the following detailed description of some specific embodiments thereof.

Preferred embodiments of the present invention will be hereinafter described with reference to the accompanying drawings, given merely by way of example, and in which:

Fig. 1 diagrammatically shows a portion of a micro-system made according to an embodiment of the invention;

Figure 1:
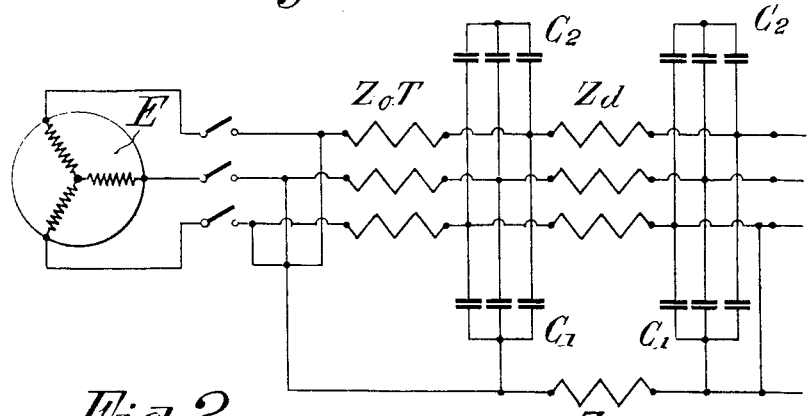

Fig. 7 diagrammatically shows the notching of the inductor and armature of a reduced scale alternator made according to the present invention.

It is known that the study of stability in an electric system is very important, for instance for the following reasons:

It permits of determining in advance when synchronous machines will fall out of step in response to a given disturbance; of exactly calculating the capacity of transmission (in kilowatts) of big energy transmission lines; of examining how the system will behave after falling out of step and to what degree it is capable of spontaneously returning to synchronism; of measuring the gain (in kilowatts) that would be obtained by using, on some lines, automatic make-and-break devices of the quick acting type. Study of stability further permits of ascertaining, in case of a long lasting defect, the influence of some operations upon a spontaneous return to synchronism (separation of networks, partial switching off of generator plants, and so on).

Up to the present time, stability problems have been studied either by calculation or by means of reduced networks, called "miniature" or "midget" networks. But, as it will be hereinafter explained, these networks did not comply with the conditions of electrical and mechanical similitude that must be observed both under normal working conditions and under transitory conditions.

The most accurate of the methods of calculation, the so-called step-by-step method, is but little accurate, due to the great number of parameters that are brought into play and to the simplifying hypotheses that have proved necessary.

Furthermore, this method involves many practical drawbacks.

As for the "midget network" method, it led to the conclusion that stability problems implied a certain number of conditions which could not be complied with, in the case of normal types of machines, when the size of said machines was reduced beyond a certain degree.

According to the present invention, I proceed in such manner that stability is studied by means of a network or of elements which are true reproductions, both from the electrical and mechanical point of view, of the corresponding big network or elements, reduced to a conveniently small scale. In other words, according to the present invention, both the electrical similitude conditions (current and power circulation) and the mechanical similitude conditions (rotation and oscillation of the machines) are complied with, both under disturbance circumstances and under normal working circumstances. In this way, according to the principle of my invention, I reconstitute the true life of the big system or network by experimentally recording, through oscillograph curves, the behaviour of a system of a structure similar but of lower power, to wit the "micro-system."

In order to obtain a reduced system or network, according to my invention, I will first set forth the conditions of similitude that must be complied with in order to obtain the desired results.

It can be demonstrated that the most general similitude, both from the electrical and the mechanical point of view, is expressed by the following equations:

$$\frac{Pe}{P'e} = \frac{Pa}{P'a} = \lambda = \frac{Pm}{P'm} = n^2 \frac{Pc}{P'c}$$

the equations on the left hand side relate to electrical similitude and those on the right hand side to mechanical similitude, and the characters representing:

$Pe$, the electrical power interchanged with the network;
$Pa$, the damping power;
$Pm$, the mechanical power on the machine shafts;
$Pc$, the kinetic energy of the rotors;
$n$, a coefficient, preferably between 1 and 10; and
$\lambda$, the similitude factor.

The numerators relate to the big system elements, while the denominators relate to the micro-system.

These equations will now be examined successively, so as to ascertain the practical conditions that result therefrom.

A. Concerning the equation $$\frac{Pe}{P'e} = \lambda$$

which expresses similitude of the electrical powers interchanged with the network, it can be demonstrated that the condition to be complied with is the following one:

All the reactances (lines, transformers, rotary machines) of the micro-system must be such that they have, under normal working conditions and also under transitory conditions, values in the same ratio (equal to a number smaller than 1) to the corresponding reactances of the big network, and this for the three systems of symmetrical components in the unbalanced state.

For the fixed elements of the system (transmission lines, transformers, and so on) it can be shown that this condition can quite well be complied with through the sole use of reactance coils, resistance coils and capacities, with the exclusion of mutual inductances. In this case, the reduced network will be such that a defect at a point thereof will produce at any time a distribution of the currents and potentials similar to the distribution that would truly exist in the corresponding big network if the same defect occurred therein.

For instance, considering the elementary case of an alternator intended to feed current through a transformer to a three-phase transmission line, the reduced network may be constituted, as shown by Fig. 1, by reactance coils, resistance coils and capacities, without mutual inductances, if (as it can perfectly well be done), the transformer of the micro-system is a reduced transformer the reactances of which have the same value, in per cent, as those of the corresponding parts of the big network. $Z_{0T}$ is the zero phase sequence impedance of the transformer.

In such a system, it will be noted that for the positive and negative phase sequence systems, the distribution of the currents in the big and reduced networks respectively is similar, whereas, for the zero phase sequence system, it suffices, in order to obtain the same result, to arrange the capacities, such as $C_1$ and $C_2$, in the manner disclosed by Fig. 1, and to insert, in the neutral line, a suitable impedance $Z_x$ the value of which is given by calculation to be:

$$Z_x = \frac{Z_{0L} - Z_d}{3}$$

in which formula the letters designate:
$Z_{0L}$, the zero phase sequence impedance of the line; and
$Z_d$, the positive phase sequence impedance of the line.

The positive phase sequence capacity is equal to $$\frac{C_1 + C_2}{2}$$

and the zero phase sequence capacity by $$\frac{C_1}{2}$$

In the micro-system, $Z_{0L}$, $Z_d$, $jC_1\omega$ and $jC_2\omega$ will be dimensioned in such manner as to have the same unitary values as in the big system, that is to say in such manner as to be in the same ratio to the corresponding magnitudes in the big system.

The complete micro-system, including any number of machines, will be constituted by the association of a plurality of elements as above described by way of example.

I will explain hereinafter that it is possible, by means of suitable devices, the principle of which has been set forth above, to obtain micro-machines the impedances of which vary, during the period of time a defect occurs, in the same way as the impedances of the homologous machines of the big network vary.

It will therefore be possible, for anyone skilled in the art, to provide in all cases the micro-system with the elements necessary for ensuring the same distribution of currents and potentials in this micro-system as in the main system, thus ensuring similitude of the powers interchanged between the machines.

B. Concerning the equation $$\frac{Pa}{P'a} = \lambda$$

which corresponds to similitude of the damping powers, calculation shows that two conditions must be complied with, to wit:

1. An electrical condition: equality of the homologous time constants in the two networks (big network and micro-network); and
2. A mechanical condition: equality, for homologous machines of the two networks, respectively, of ratios:

$$\frac{\frac{\Delta p}{\Delta N}}{Pn}$$

in which $\Delta p$ designates the variation of the mechanical losses corresponding to a variation $\Delta N$ of the nominal speed; and,
$Pn$ is the nominal power.

The first of these conditions is by far more important than the other.

Mechanical damping (variation of losses due to friction, ventilation, magnetic losses) at the beginning of the defect (first oscillation) is negligible in comparison with the electric damping (Joule effect) so that an approximate solution of the problem set by the second condition will be sufficient for an accurate study of the phenomenons relating to the beginning of the defect (determination of the conditions under which a machine falls out of step).

C. Concerning the equation $$\frac{Pm}{P'm} = \lambda$$

relating to the mechanical powers measured on the machine shafts, it is very easy to observe. It corresponds to:

$$\frac{Pn}{P'n} = \lambda$$

which expresses similitude of the nominal powers of the driving motors, the alternator generators and the motors equivalent to receiver synchronous motors.

D. Finally, concerning the relation $$n^2 \frac{Pc}{P'c} = \lambda$$

which relates to the kinetic energies of the rotary masses, it must be noted that constant $n$ designates the ratio of the pulsations or frequencies $$n = \frac{\omega'}{\omega} = \frac{f'}{f}$$

$\omega$ and $f$ being the pulsation and the frequency, respectively of the big network ($f=50$), $\omega'$ and $f'$ those of the reduced system.

The above set forth condition is equivalent to the following one:

$$H' = n^2 H$$

in which H and H' are the inertia constants of the big machine and the reduced machine, respectively, that is to say ratios of the form:

$$\frac{I\omega^2}{Pn}$$

If $n$ is equal to 1, the inertia constants of the corresponding machines of the two networks must be the same. If $n$ is greater than 1, the inertia constant of each reduced machine must be $n^2$ times smaller than that of the corresponding machine of the big network.

As a matter of fact, it is important to note that, if $f'=nf$, it is necessary to consider a unit of time in the micro-system $n$ times smaller than the unit of time considered in the big system, because the time unit is that corresponding to complete sweeping of a pole of the stator.

To sum up, the above conditions may be stated as follows:

a. Electrical condition: the micro-system must be represented, either as a whole or in one of its portions, at any time, either in balanced or in unbalanced conditions, and for the various systems of unbalance symmetrical components, by the same equivalent diagram expressed in unitary value; and b. Mechanical conditions: talking in unitary values, the rotary machines of the micro-system must have the same kinetic energy (multiplied by the square of the ratio of the frequencies) and the same damping as the corresponding machines of the big system.

The similitude conditions having thus been set forth, I will now describe various means for complying with these conditions. But it should be well understood that these specific means are given merely by way of example, and that it is possible for someone skilled in the art to find equivalent means giving the same results.

Concerning the nominal working voltages to be employed in the micro-system, it is advantageous to choose them inside the range of usual voltages (110–220 volts), which permits, in particular, of using current supplied for illuminating purposes.

Concerning the speeds or frequencies, it may be advantageous, in order to reduce the dimensions of the elements representing the fixed portions of the network (and also for the conservation of ratio $$\frac{L\omega}{R}$$

which may be as high as 15 or 20 in transformers) to operate the micro-system at a frequency of at least 50, ratio $n$ then ranging from 1 to 10. Values 1, 2, or 3 seem to be preferable but are given merely by way of indication.

It will be possible, with such values, to take, for $\lambda$, very high values, for instance averaging 100,000.

All these values having been chosen, it is relatively easy to obtain similitude between the mechanical powers and also between the kinetic energies. In particular, the kinetic energy can be adjusted by fitting the rotating parts with fly-wheels of suitable structure. The relative importance of the fly-wheels will increase with the value of $n$.

Concerning the obtainment of similitude between the electric powers in the micro-system and the big system, respectively, it will be necessary to devise on the one hand the fixed elements and, on the other hand, the movable elements, in accordance with the above conditions relating to the determination of homologous resistances, especially with reference to the diagram of Fig. 1 or to any other diagram including suitable reactance coils and capacities and complying with the general conditions above set forth (necessity of keeping the same ratio between homologous reactances, even under disturbance conditions).

In the case of rotary elements, adjustment of the various magnitudes of a micro-element in a given ratio to the corresponding magnitudes of the full-sized element may, if not obtained by construction, necessitate the adjunction of suitable additional impedances. I may also, especially in the case of armatures, provide them with leak resistances, as it will be hereinafter described with reference to Fig. 4.

Concerning the obtainment of similitude between the damping powers and, in particular, the first condition above set forth (equality of the homologous time constants), it is advantageous to proceed in the following manner, which is applicable to all kinds of systems, whenever it is desired to modify the time constant of a circuit.

According to my invention, in order to obtain this result, I introduce into the circuit of resistance R that is being considered an electromotive force E of the form $E=kI$, so that the apparent resistance in the circuit becomes $r$, equal to $R-k$, and, in order to take into account the difficulty of keeping $k$ and $R-k$ constant (due chiefly to hysteresis phenomenons) I place this auxiliary source of electromotive force under control of suitable regulating means. Preferably, according to my invention, the regulating means in question are of low inertia and high amplification. The amplifying means are for instance influenced by a very small potential difference which may be $$v = E - kI$$

or $$v = \frac{E - kI}{p}$$

$p$ being a proportionality factor.

Figure 2:
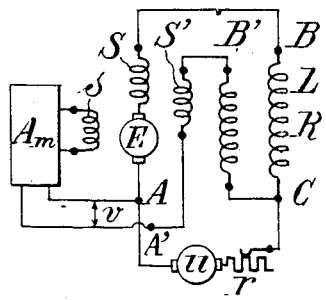
Fig. 2 is a diagram showing a device according to the present invention for adjusting the time constant of an electric machine.

This principle can be brought into practice in many different ways. Some examples will be described with reference to the drawings:

In one of these embodiments, illustrated by Fig. 2, circuit element BC (the resistance of which is R, while its inductance is L) is for instance constituted by the winding of a machine the time constant of which is to be adjusted or modified.

In Fig. 2, E represents the auxiliary source of energy for introducing into the circuit the electromotive force above referred to. By way of indication, such a source may be constituted by a series wound exciter the winding of which is shown at S on the drawing.

$u$ is a reference source of energy adapted to keep current I at a suitable value. This source $u$ is connected in series with an adjustable resistance $r$.

In order to compensate winding BC, I provide a winding B'C. This winding B'C is wound on the same magnetic circuit as BC, with the same number of turns and a coupling as tight as possible. Preferably, these two windings BC and B'C are formed together and simultaneously, both wires being held in the same hand, in order to reduce leakage between them to a minimum. A similar winding S' may be provided in a likewise manner opposite winding S.

Finally, A$m$ is an amplifier, for instance of the electronic type. This amplifier receives the voltage $v$ across points A and A' of the circuit, as it will be explained. Amplifier A$m$ controls source E, for instance by acting through a shunt armature $s$ cooperating with said source.

Considering first the circuit which contains source $u$, resistance $r$, point C, reactance coil CB', winding S', point A', amplifier A$m$, and point A, and in view of the fact that the current consumption through the amplifier is practically negligible as compared with the current I that flows through winding BC, I has the following relation:

$$u = rI + n\frac{d\Phi}{dt} + v$$

Now $$n\frac{d\Phi}{dt}$$

is equal to $$L\frac{dI}{dt}$$

since the flux is the same in both of the windings BC and B'C. Therefore, if regulating device A$m$ is adjusted to keep $v$ substantially equal to zero, the preceding equation becomes:

$$u = rI + L\frac{dI}{dt}$$

As the current absorbed by circuit C, B', A', A, C is zero, this equation applies to circuit C, B, S, A, C, and finally it is clear that the apparent resistance of circuit BC has become equal to $r$, so that the new time constant is:

$$T = \frac{L}{R}$$

Of course, the resistance will be made adjustable, same as voltage $v$.

Figure 6:
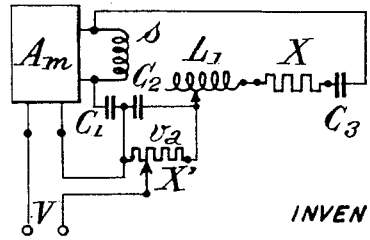
Fig. 6 is a diagram of an auxiliary device to be associated with any of these devices.

If necessary, and in order to avoid disturbing phenomenons, I may add to the device, as shown by Fig. 6, means combined with the amplifier for producing a potential difference $v_a$ opposed to $v$, but which appears only just when the current in the amplifier tends to exceed the value necessary for the correction. With such an arrangement, end condensers $C_1$ and $C_3$ permit of directly applying the output voltage to the input side of the amplifier. The adjustable inductance shown at $L_1$ permits of adjusting time $t$ when $v_a$ assumes a predetermined value. Reference character X designates a high resistance potentiometer (the time constant of which is great as compared with that of $s$) which serves to the adjustment of the amplitude of $v_a$.

Another example of a device according to the present invention will show that it is not necessary to provide a winding such as B'C and that adjustment of the system can be obtained in various ways.

Figure 3:
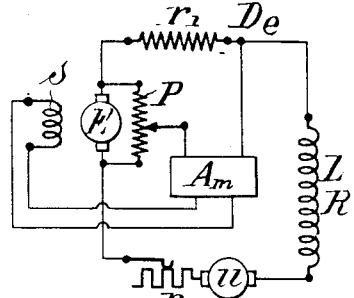
Figs. 3, 4 and 5 are views, similar to Fig. 2, showing other embodiments of a time constant adjusting device according to the invention.

According to the embodiment illustrated by Fig. 3, the regulating device A$m$ is subjected to a potential difference of the form:

$$\frac{E - kI}{p}$$

This result may be obtained, for instance, by disposing said regulating device A$m$ between a suitably chosen point of a potentiometer P mounted across the terminals of the source E of auxiliary electromotive force and a point such as D$e$ of the circuit element the time constant of which is to be modified. For instance this point D$e$ is one of the ends of an auxiliary resistance $r_1$.

Now, if I consider the above mentioned circuit element in question, which includes electromotive force sources E and $u$, I have the following equation:

$$E + u = (R + r_1)I + rI + n\frac{d\Phi}{dt}$$

whereas, if I consider the shunt circuit including potentiometer P, regulating device A$m$, and resistance $r_1$, I have:

$$\frac{E}{p} = r_1 I$$

By combining these two equations, I obtain the following:

$$u = (R + r_1 - pr_1)I + rI + L\frac{dI}{dt}$$

Now, if the potentiometric adjustment is suitably performed, it is possible to have:

$$R + r_1 - pr_1 = 0$$

and, in this case, as in the example described with reference to Fig. 2:

$$u = rI + L\frac{dI}{dt}$$

so that the time constant is:

$$T = \frac{L}{R}$$

In this embodiment also, an auxiliary electromotive force $E = kI$ is inserted in the circuit so as to reduce the apparent resistance thereof.

Figure 5:
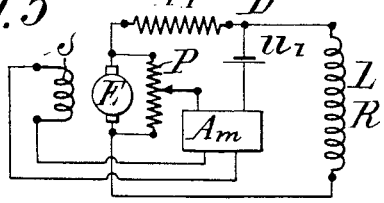
Figure 4:
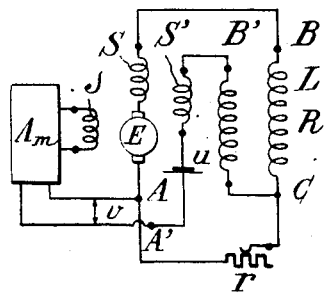

An interesting improvement in both of the devices above described, to wit that illustrated by Fig. 2, which includes a compensating winding and that illustrated by Fig. 3, which includes a potentiometric arrangement, consists in disposing source $u$ in the control circuit of the regulating device. In the first case, as shown by Fig. 4, this source $u$ plays exactly the same part as in the above described embodiments. In the second case, as shown by Fig. 5, the electromotive force of this source $u_1$ must be $p$ times smaller than in the former example. This arrangement is advantageous for the reason that practically no current flows through the control circuit so that it is preferable to place source $u$ in this circuit rather than in a circuit through which high currents are flowing.

According to another feature of my invention, in the embodiment including a potentiometer (Figs. 3 and 5), resistance $r$ may be dispensed with owing to a suitable adjustment of the potentiometer, that is to say by adjusting it in such manner that:

$$R - r_1(p-1) = r$$

Finally, it should be noted that source E which, in the above described examples, has been supposed to consist of an exciter, may be made in any other suitable manner. For instance, it may be constituted by rectifiers suitably controlled by voltage $v$. I might for instance make use of thyratrons fed through a transformer from an alternating current feeding network and to the grids of which would be applied the impulses supplied by impulse transformers, means influenced by voltage $v$ and adapted to produce a dephasing of the impulses being combined with said transformers. Such tubes, arranged in this way, would act in the desired manner on the electromotive force E to be supplied by said tubes, to ensure the desired regulation.

This source E might also be constituted by the combination of a variable resistance and of a fixed direct source (battery or the like), said resistance being, for instance, the internal resistance of an electronic device traversed by current I, this resistance being given at any time the desired value owing to the fact that one of the grids of said device is acted upon by a potential difference influenced by voltage $v$.

Whatever be the particular construction that is chosen, a device of the kind of those described with reference to Figs. 2 to 6 makes it possible to determine at will the time constant of any element or machine of the system that is being considered. In particular, it permits of adjusting the time constant of the armature of any miniature machine the conditions of operation or of stability of which are to be studied, this machine or element being considered either alone or in connection with the whole of the distribution system. It is thus possible to comply with the condition of equality of homologous time constants, or any other similitude conditions in which time constants are involved.

Besides, it should be noted that any other means might be used, within the scope of the invention, for obtaining the same result.

In particular, in the case of the armatures of the machines included in the micro-system, it seems that the above mentioned conditions (relative to time constants) can be complied with by suitably dimensioning said armatures, and in particular by making use of big notches packed with copper.

The use of such notches will introduce other problems, relating to magnetic saturation and leakage reactance.

It has been above stated that it is necessary to employ, for the elements of the network (or machine) to be studied and for the elements of the micro-network (or micro-machine), homologous reactances, and in particular homologous leakage reactances. On the other hand, it is necessary to obtain the same states of saturation in respective homologous magnetic circuits of the micro system and the big system.

Now, due to the provision of big notches (if it is desired to comply with the conditions concerning the similitude of the ampere-turns absorbed in the various portions of the magnetic circuits) the magnetizing currents are low and the leakage reactances are also low, which makes it difficult to comply with the above mentioned conditions in the case of micro-machines of the usual type.

According to the present invention, special means will be provided for obviating these difficulties, i. e. for increasing these currents and these leakage reactances.

Fig. 7 shows an example of such means as adapted to be utilized in connection with a machine for micro-system.

The inductor 1 of the machine, intended to be inserted in a micro-system, is provided with notches 2, sufficiently large for containing the desired windings and damping means, and which may be combined with slots 3 for increasing the leakage reactance.

The armature 4 is provided with large notches 5, in such manner that the copper cross-section is sufficiently large for ensuring the desired time constant. Furthermore, these notches are arranged to leave between them arms 6 of relatively small cross section in which magnetic saturation can easily be obtained. Finally, in order to increase the leakage reactance, long and thin slots 7 are provided. It should be noted that these leakages might also be localized (both for the armature and for the inductor) in inductance coils external to the machine and advantageously adjustable. But, in this case, the condition of physical similitude is not so well complied with and the space occupied is relatively more considerable.

Such an arrangement makes it possible to obtain saturation states for the homologous circuits and the homologous leakage reactances in accordance with the conditions above set forth when the reduced machines are of very small size.

But, of course, it should be well understood that, within the scope of the present invention, such means may be replaced by equivalent means.

I will now proceed to describe, merely by way of example, the essential elements of a micro-system made according to my invention.

This micro-system will for instance include:

a. Fixed elements for the transmission and the utilization of electric energy, such as transformers, transmission lines, rectifiers (especially in the case of direct current transmission), passive resistances such as used for lighting, heating (utilization) and so on;

b. Rotary machines representing mechanical energy generators or receivers (alternators, synchronous and asynchronous motors, etc.); and c. Rotary machines representing mechanical energy generators or receivers, such as hydraulic or thermic turbines, pumps, fans, and so on.

Concerning the fixed elements, the reactances and time constants of which are arranged as above described, they include, for instance:

On the one hand, and chiefly, elements representing the lines, transformers, existing stations, and future extensions as may be foreseen; and On the other hand, some variable elements intended to correspond to extensions, modifications, studies that have not yet been considered but might be and also representing passive loads (variable with the period of the year and the time of the day).

Concerning the electric rotary machines, they will be provided with alternators of the type or types of those employed in the network to be studied (for instance with projecting poles in the case of hydraulic alternators and with smooth rotors in the case of turbo-alternators), and also with synchronous or asynchronous motors.

Of course, it is advantageous to make these machines of very low power, but this is not possible beyond a certain degree, due to the nature of the materials employed and to the impossibility of observing the conditions of similitude, and in particular of electrical similitude, which might be encountered if the power were too much reduced.

Experience seems to teach that, in the case of alternators, very low powers, of an order of magnitude of 1 kilowatt, can be obtained. They might then correspond, in the big system, to powers of 100,000 kilowatts for suitable values of the coefficient $\lambda$ above mentioned. Up to the present time, it had been impossible to obtain such ratios of similitude and such values.

It should be well understood that the number of equivalent machines (always very small in the case of the usual "step by step" method) can, with my invention, be as high as it may be desired. For instance, I may provide one or several alternators for each power station (a reduced size alternator may represent several alternators of said power station) and also one synchronous machine and one asynchronous machine for each center of consumption of electrical energy.

Electrical similitude between these machines (reactances and time constants) will be obtained as above explained. As for mechanical similitude, it will be for instance obtained by means of standard fly-wheels, advantageously adapted to be removably fixed to the shafts of the reduced machines. In this way, and with a suitable adjustment of the inertia constant, it is possible to represent by a single unit, the two, three, or four identical machines that are provided at a given power station of the electric system to be studied.

Finally, concerning the rotary machines for generating or consuming mechanical energy, it is advisable to make use, for instance:

As generators, of small direct current motors, or even of small air or water turbines, provided with suitable means for acting on the output and the power thereof, with a view to representing the phenomena that are due to gating variations occurring in the hydraulic alternators or turbo-alternators that these reduced machines are supposed to represent; and As receivers, structures such, for instance, as passive resistances representing receivers that dissipate electrical energy into heat, synchronous and asynchronous motors driving various devices for absorbing energy the characteristics of which (power as a function of speed) are different and in relation with the characteristics of the machines of the big system.

The powers absorbed by these receivers vary, as a matter of fact, as a function of the frequency in very different ways according to the nature of the characteristics, for instance according as these receivers consist of lamps, pumps, fans, and so on. It is therefore of high interest to see what takes place in the case of a drop of frequency resulting from a defect. The micro-network according to the present invention permits of studying these phenomenons.

In a general way, I shall make use, in order to represent the load on portions or elements of the network, of circuits including an asynchronous motor, a synchronous motor and a passive imperance. These motors will be associated with means for absorbing the energy the "torque-speed" characteristics of which will be varied and adjustable (case of fans, pumps, and so on). Likewise, resistances will be added in such manner as to obtain "resistance-temperature" characteristics that are themselves adjustable (case of lighting lamps).

In order to represent driving turbines in the reduced network, it is advisable to provide the corresponding portions of this network with element having "torque-speed" characteristics and regulating means similar to those of the homologous turbines in the big system.

To a micro-network including the various elements which have been above mentioned, I may still add the following parts:

At least one device for eliminating defects after times that are variable and known, the same device being adapted to work for the various sections of the line;

Measurement and recording apparatus such as ammeters, voltmeters, oscillographs and the like;

And energy recuperating devices, especially if the power of the elements of the micro-system is relatively important, these devices consisting for instance of pumps driven by the machines which represent the above mentioned receivers, said pumps being adapted to discharge water or air into the feed reservoirs of the turbines which are utilized for representing the electric generators.

Anyway, and whatever be the particular embodiment that is chosen, it is possible, with the method according to the present invention, to conduct studies and experiments concerning stability (and other factors) in distribution systems, or in the machines included in such systems, with an accuracy as high as it may be desired. This results from the fact that it is possible to record the phenomenons that occur at any time in a system which is practically identical with the system to be studied, and which remains identical even under disturbance conditions. This important result is due to the fact that care has been taken to observe a rigorous similitude between corresponding elements of the micro-network and the big network, this similitude being considered both from the electrical and the mechanical point of view and both for the rotary elements of the networks and for the fixed elements thereof.

On the other hand, it will be noted that, owing to the accurate determination of the conditions of damping in the circuits and of the inertia of the rotating parts, it is possible to make use of frequencies and time units which are different for the big network and the reduced network, whereby reduced elements of very low power can be obtained.

On the other hand, the obtainment of these reduced elements of very low power is made possible by special means as above described for the representation of the transmission lines for the adjustment of the time constants, states of saturation and leakage reactances, which permit of complying with conditions of true similitude. Up to the present time, it has been considered that such a result could not be obtained in the case of high reduction ratios.

The "life" of the big network can, according to the present invention, be represented in a thoroughly accurate manner, even under disturbance conditions, a result which, in prior practice, had but very imperfectly been obtained. Likewise, with the method according to my invention, it is possible separately to study the stability conditions of the machines of the network considered individually.

Furthermore, the method according to the present invention involves a plant which is relatively little expensive. It will permit of fully solving the various stability problems that occur in practice and that have been above mentioned.

My invention further permits of very quickly solving most of the problems that are met with in the study of large energy transmission networks and among which the following may be cited: determination of the values of the short-circuit currents at different points for various kinds of faults, study of the regulation (reactive powers to be introduced into the system for maintaining suitable values of a plurality of potential differences, and so on), study of the operation of the protection relays, etc.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principles of the present invention as comprehended within the scope of the accompanying claims.

What I claim is:

1. For study of a system including electric machines and at least one electric transmission line connected therewith, a micro-system reproducing said system on a reduced scale which comprises, in combination, electric machines and at least one electric transmission line connected therewith arranged similarly to the corresponding elements of the big system, said machines of the mincro-system having nominal powers such that the ratio of each of them to the nominal power of the corresponding machine of the big system has a given value, smaller than 1 and the same for all of said machines, means for giving the inertia constants of the machines of the micro-system values such that the ratio of each of them to the inertia constant of the corresponding machine of the big system is equal to the square of the ratio of the current frequencies in the micro-system and the big system respectively, means for keeping always the reactances of the electrical elements of the micro-system in the same ratio to the reactances of the corresponding elements of the big system respectively, this ratio being equal to the above mentioned given value, and means for giving each of said circuit elements of the micro-system including a reactance a time constant equal to the time constant of the corresponding element of the big system, said last mentioned means including an auxiliary source connected in series with said last mentioned element for introducing thereinto an electromotive force proportional to the current, means for controlling said auxiliary source, and amplifying means responsive to variations of the electromotive-force-to-current ratio in said circuit for operating said controlling means.

2. For study of a system including electric machines and at least one electric transmission line connected therewith, a micro-system reproducing said system on a reduced scale which comprises, in combination, electric machines and at least one electric transmission line connected therewith arranged similarly to the corresponding elements of the big system, said machines of the micro-system having nominal powers such that the ratio of each of them to the nominal power of the corresponding machine of the big system has a given value, smaller than 1 and the same for all of said machines, means for giving the inertia constants of the machines of the micro-system values such that the ratio of each of them to the inertia constant of the corresponding machine of the big system is equal to the square of the ratio of the current frequencies in the micro-system and the big system respectively, means for keeping always the reactances of the electrical elements of the micro-system in the same ratio to the reactances of the corresponding elements of the big system respectively, this ratio being equal to the above mentioned given value, and means for giving each of said circuit elements of the micro-system including a reactance a time constant equal to the time constant of the corresponding element of the big system, said last mentioned means including an auxiliary source of external energy connected in series with said last mentioned element for introducing thereinto an electromotive force proportional to the current, means for controlling said auxiliary source, a compensating circuit coupled with said reactance, and amplifying means inserted between said source and said compensating circuit for operating said controlling means.

3. For study of a system including electric machines and at least one electric transmission line connected therewith, a micro-system reproducing said system on a reduced scale which comprises, in combination, electric machines and at least one electric transmission line connected therewith arranged similarly to the corresponding elements of the big system, said machines of the micro-system having nominal powers such that the ratio of each of them to the nominal power of the corresponding machine of the big system has a given value, smaller than 1 and the same for all of said machines, means for giving the inertia constants of the machines of the microsystem values such that the ratio of each of them to the inertia constant of the corresponding machine of the big system is equal to the square of the ratio of the current frequencies in the micro-system and the big system respectively, means for keeping always the reactances of the electrical elements of the micro-system in the same ratio to the reactances of the corresponding elements of the big system respectively, this ration being equal to the above mentioned given value, and means for giving each of said circuit elements of the micro-system including a reactance a time constant equal to the time constant of the corresponding element of the big system, said last mentioned means including an auxiliary source of external energy connected in series with said last mentioned element for introducing thereinto an electromotive force proportional to the current, means for controlling said auxiliary source, a potentiometer connected across the terminals of said source, and amplifying means inserted between said potentiometer and a point of said circuit element of the micro-system.

4. For study of a system including electric machines and at least one electric transmission line connected therewith, a micro-system reproducing said system on a reduced scale which comprises, in combination, electric machines and at least one electric transmission line connected therewith arranged similarly to the corresponding elements of the big system, said machines of the micro-system having nominal powers such that the ratio of each of them to the nominal power of the corresponding machine of the big system has a given value, smaller than 1 and the same for all of said machines, means for giving the inertia constants of the machines of the micro-system values such that the ratio of each of them to the inertia constant of the corresponding machine of the big system is equal to the square of the ratio of the current frequencies in the micro-system and the big system respectively, means for keeping always the reactances of the electrical elements of the micro-system in the same ratio to the reactances of the corresponding elements of the big system respectively, this ratio being equal to the above mentioned given value, and means for giving each of said circuit elements of the micro-system including a reactance a time constant equal to the time constant of the corresponding element of the big system, said last mentioned means including an auxiliary source of external energy connected in series with said last mentioned element for introducing thereinto an electromotive force proportional to the current, means for controlling said auxiliary source, a compensating circuit coupled with said reactance, amplifying means inserted between said source and said compensating circuit for operating said controlling means, and means including a reference source connected with said micro-system circuit element to permit adjustment of the current therein.

5. For study of a system including electric machines and at least one electric transmission line connected therewith, a micro-system reproducing said system on a reduced scale which comprises, in combination, electric machines and at least one electric transmission line connected therewith arranged similarly to the corresponding elements of the big system, said machines of the micro-system having nominal powers such that the ratio of each of them to the nominal power of the corresponding machine of the big system has a given value, smaller than 1 and the same for all of said machines, means for giving the inertia constants of the machines of the micro-system values such that the ratio of each of them to the inertia constant of the corresponding machine of the big system is equal to the square of the ratio of the current frequencies in the micro-system and the big system respectively, means for keeping always the reactances of the electrical elements of the micro-system in the same ratio to the reactances of the corresponding elements of the big system respectively, this ratio being equal to the above mentioned given value, and means for giving each of said circuit elements of the micro-system including a reactance a time constant equal to the time constant of the corresponding element of the big system, said last mentioned means including an auxiliary source of external energy connected in series with said last mentioned element for introducing thereinto an electromotive force proportional to the current, means for controlling said auxiliary source, a potentiometer connected across the terminals of said source, amplifying means inserted between said potentiometer and a point of said circuit element of the micro-system, and means including a reference source connected with said circuit element to permit adjustment of the current therein.

6. For study of a system including electric machines and at least one electric transmission line connected therewith, a micro-system reproducing said system on a reduced scale which comprises, in combination, electric machines and at least one electric transmission line connected therewith arranged similarly to the corresponding elements of the big system, said machines of the micro-system having nominal powers such that the ratio of each of them to the nominal power of the corresponding machine of the big system has a given value, smaller than 1 and the same for all of said machines, means for giving the inertia constants of the machines of the micro-system values such that the ratio of each of them to the inertia constant of the corresponding machine of the big system is equal to the square of the ratio of the current frequencies in the micro-system and the big system respectively, means for keeping always the reactances of the electrical elements of the micro-system in the same ratio to the reactances of the corresponding elements of the big system respectively, this ratio being equal to the above mentioned given value, and means for giving each of said circuit elements of the micro-system including a reactance a time constant equal to the time constant of the corresponding element of the big system, said last mentioned means including an auxiliary source of external energy connected in series with said last mentioned element for introducing thereinto an electromotive force proportional to the current, means for controlling said auxiliary source, a compensating circuit coupled with said reactance, amplifying means inserted between said source and said compensating circuit for operating said controlling means and means including a reference source inserted in series in said circuit element of the micro-system, for adjustment of the current therein.

7. For a study of a system including electric machines and at least one electric transmission line connected therewith, a micro-system reproducing said system on a reduced scale which comprises, in combination, electric machines and at least one electric transmission line connected therewith arranged similarly to the corresponding elements of the big system, said machines of the micro-system having nominal powers of the corresponding machine of the big system has a given value, smaller than 1 and the same for all of said machines, means for giving the inertia constants of the machines of the micro-system values such that the ratio of each of them to the inertia constant of the corresponding machine of the big system is equal to the square of the ratio of the current frequencies in the micro-system and the big system respectively, means for keeping always the reactances of the electrical elements of the micro-system in the same ratio to the reactances of the corresponding elements of the big system respectively, this ratio being equal to the above mentioned given value, and means for giving each of said circuit elements of the micro-system including a reactance a time constant equal to the time constant of the corresponding element of the big system, said last mentioned means including an auxiliary source of external energy connected in series with said last mentioned element for introducing thereinto an electromotive force proportional to the current, means for controlling said auxiliary source, a potentiometer connected across the terminals of said source, amplifying means inserted between said potentiometer and a point of said circuit element of the micro-system, and means, including a reference source inserted in series in said circuit element, for adjustment of the current therein.

8. For study of a system including electric machines and at least one electric transmission line connected therewith, a micro-system reproducing said system on a reduced scale which comprises, in combination, electric machines and at least one electric transmission line connected therewith arranged similarly to the corresponding elements of the big system, said machines of the micro-system having nominal powers such that the ratio of each of them to the nominal power of the corresponding machine of the big system has a given value, smaller than 1 and the same for all of said machines, means for giving the inertia constants of the machines of the micro-system values such that the ratio of each of them to the inertia constant of the corresponding machine of the big system is equal to the square of the ratio of the current frequencies in the micro-system and the big system respectively, means for keeping always the reactances of the electrical elements of the micro-system in the same ratio to the reactances of the corresponding elements of the big system respectively, this ratio being equal to the above mentioned given value, and means for giving each of said circuit elements of the micro-system including a reactance a time constant equal to the time constant of the corresponding element of the big system, said means including an auxiliary source of external energy connected in series with said last mentioned circuit element for introducing thereinto an electromotive force proportional to the current, means for controlling said auxiliary source, a compensating circuit coupled with said reactance, amplifying means inserted between said source and said compensating circuit for operating said controlling means and means including a reference source inserted in series in said compensating circuit for adjustment of the current in the micro-system circuit element.

9. For study of a system including electric machines and at least one electric transmission line connected therewith, a micro-system reproducing said system on a reduced scale which comprises, in combination, electric machines and at least one electric transmission line connected therewith arranged similarly to the corresponding elements of the big system, said machines of the micro-system having normal powers such that the ratio of each of them to the nominal power of the corresponding machine of the big system has a given value, smaller than 1 and the same for all of said machines, means for giving the inertia constants of the machines of the micro-system values such that the ratio of each of them to the inertia constant of the corresponding machine of the big system is equal to the square of the ratio of the current frequencies in the micro-system and the big system respectively, means for keeping always the reactances of the electrical elements of the micro-system in the same ratio to the reactances of the corresponding elements of the big system respectively, this ratio being equal to the above mentioned given value, and means for giving each of said circuit elements of the micro-system including a reactance a time constant equal to the time constant of the corresponding element of the big system, said means including an auxiliary source of external energy connected in series with said last mentioned element for introducing thereinto an electromotive force proportional to the current, means for controlling said auxiliary source, a potentiometer connected across the terminals of said source, and amplifying means inserted between said potentiometer and a point of said circuit element of the micro-system, and means including a reference source inserted in series with said amplifier and said potentiometer for adjustment of the current in the micro-system circuit element.

10. An electric micro-system which comprises, in combination, electric machines and at least one electric transmission line connected therewith, means for adjusting the inertia constants of said machines, means for adjusting the reactances of the electrical elements of the micro-system, and means for adjusting the time constant of each of said elements of the micro-system, said means including an auxiliary source connected in series with said last mentioned element for introducing thereinto an electromotive force proportional to the current, means for controlling said auxiliary source, and amplifying means responsive to variations of the electromotive-force-to-current ratio in said circuit for operating said controlling means.

11. An electric micro-system which comprises, in combination, electric machines and at least one electric transmission line connected therewith, means for adjusting the inertia constants of said machines, means for adjusting the reactances of the electrical elements of the micro-system, and means for adjusting the time constant of each of said elements of the micro-system, said means including an auxiliary source of external energy connected in series with said last mentioned element for introducing thereinto an electromotive force proportional to the current, means for controlling said auxiliary source, a compensating circuit coupled with said reactance, and amplifying means inserted between said source and said compensating circuit for operating said controlling means.

12. An electric micro-system which comprises, in combination, electric machines and at least one electric transmission line connected therewith, means for adjusting the inertia constants of said machines, means for adjusting the reactances of the electrical elements of the micro-system, and means for adjusting the time constant of each of said elements of the micro-system, said means including an auxiliary source of external energy connected in series with said last mentioned element for introducing thereinto an electromotive force proportional to the current, means for controlling said auxiliary source, a potentiometer connected across the terminals of said source, and amplifying means inserted between said potentiometer and a point of said circuit element of the micro-system.

13. An electric micro-system which comprises, in combination, electric machines and at least one electric transmission line connected therewith, means for adjusting the inertia constants of said machines, means for adjusting the reactances of the electrical elements of the micro-system, and means for adjusting the time constant of each of said elements of the micro-system, said means including an auxiliary source of external energy connected in series with said last mentioned element for introducing thereinto an electromotive force proportional to the current, means for controlling said auxiliary source, a compensating circuit coupled with said reactance, amplifying means inserted between said source and said compensating circuit for operating said controlling means, and means including a reference source connected with said micro-system circuit element to permit adjustment of the current therein.

14. An electric micro-system which comprises, in combination, electric machines and at least one electric transmission line connected therewith, means for adjusting the inertia constants of said machines, means for adjusting the reactances of the electrical elements of the micro-system, and means for adjusting the time constant of each of said elements of the micro-system, said means including an auxiliary source of external energy connected in series with said last mentioned element for introducing thereinto an electromotive force proportional to the current, means for controlling said auxiliary source, a potentiometer connected across the terminals of said source, amplifying means inserted between said potentiometer and a point of said circuit element of the micro-system, and means including a reference source connected with said circuit element to permit adjustment of the current therein.

15. An electric micro-system which comprises, in combination, electric machines and at least one electric transmission line connected therewith, means for adjusting the inertia constants of said machines, means for adjusting the reactances of the electrical elements of the micro-system, and means for adjusting the time constant of each of said elements of the micro-system, said means including an auxiliary source of external energy connected in series with said last mentioned element for introducing thereinto an electromotive force proportional to the current, means for controlling said auxiliary source, a compensating circuit coupled with said reactance, amplifying means inserted between said source and said compensating circuit for operating said controlling means and means, including a reference source inserted in series in said circuit element of the micro-system, for adjustment of the current therein.

16. An electric micro-system which comprises, in combination, electric machines and at least one electric transmission line connected therewith, means for adjusting the inertia constants of said machines, means for adjusting the reactances of the electrical elements of the micro-system, and means for adjusting the time constant of each of said elements of the micro-system, said means including an auxiliary source of external energy connected in series with said last mentioned element for introducing thereinto an electromotive force proportional to the current, means for controlling said auxiliary source, a potentiometer connected across the terminals of said source, amplifying means inserted between said potentiometer and a point of said circuit element of the micro-system, and means, including a reference source inserted in series in said circuit element, for adjustment of the current therein.

17. For study of a system including electric machines and at least one electric transmission line connected therewith, a micro-system reproducing said system on a reduced scale which comprises, in combination, electric machines and at least one electric transmission line connected therewith arranged similarly to the corresponding elements of the big system, said machines of the micro-system having nominal powers such that the ratio of each of them to the nominal power of the corresponding machine of the big system has a given value, smaller than 1 and the same for all of said machines, means for giving the inertia constants of the machines of the micro-system values such that the ratio of each of them to the inertia constant of the corresponding machine of the big system is equal to the square of the ratio of the current frequencies in the micro-system and the big system respectively, means for keeping always the reactances of the electrical elements of the micro-system in the same ratio to the reactances of the corresponding elements of the big system respectively, this ratio being equal to the above mentioned given value, said last mentioned means including zero phase sequence and positive phase sequence impedances in said micro-system line in the same ratio to the respective zero phase sequence and positive phase sequence impedances of the big system line, a neutral wire for said micro-system line, an impedance in said neutral wire equal to one third of the difference between said zero phase sequence and positive phase sequence impedances of the micro-system line, a group of two sets of three capacities in parallel inserted between the wires of said micro-system line, one of said sets being connected directly to said neutral wire on one side of said impedance therein, and a similar group of capacities mounted in the same manner connected to said neutral wire on the other side of said last mentioned impedance, said capacities being proportional to the corresponding capacities of the big system in a ratio equal to said above mentioned given value, and means for giving each of said circuit elements of the micro-system including a reactance a time constant equal to the time constant of the corresponding element of the big system, said last mentioned means including an auxiliary source connected in series with said last mentioned element for introducing thereinto an electromotive force proportional to the current, means for controlling said auxiliary source, and amplifying means responsive to variations of the electromotive-force-to-current ratio in said circuit for operating said controlling means.

18. For study of a system including electric machines and at least one electric transmission line connected therewith, a micro-system reproducing said system on a reduced scale which comprises, in combination, electric machines and at least one electric transmission line connected therewith arranged similarly to the corresponding elements of the big system, said machines of the micro-system having nominal powers such that the ratio of each of them to the nominal power of the corresponding machine of the big system has a given value, smaller than 1 and the same for all of said machines, means for giving the inertia constants of the machines of the micro-system values such that the ratio of each of them to the inertia constant of the corresponding machine of the big system is equal to the square of the ratio of the current frequencies in the micro-system and the big system respectively, means for keeping always the reactances of the electrical elements of the micro-system in the same ratio to the reactances of the corresponding elements of the big system respectively, this ratio being equal to the above mentioned given value, said last mentioned means including zero phase sequence and positive phase sequence impedances in said micro-system line in the same ratio to the respective zero phase sequence and positive phase sequence impedances of the big system line, a neutral wire for said micro-system line, an impedance in said neutral wire equal to one third of the difference between said zero phase sequence and positive phase sequence impedances of the micro-system line, a group of two sets of three capacities in parallel inserted between the wires of said micro-system line, one of said sets being connected directly to said neutral wire on one side of said impedance therein, and a similar group of capacities mounted in the same manner connected to said neutral wire on the other side of said last mentioned impedance, said capacities being proportional to the corresponding capacities of the big system in a ratio equal to said above mentioned given value, and means for giving each of said circuit elements of the micro-system including a reactance a time constant equal to the time constant of the corresponding element of the big system, said last mentioned means including an auxiliary source of external energy connected in series with said last mentioned element for introducing thereinto an electromotive force proportional to the current, means for controlling said auxiliary source, a compensating circuit coupled with said reactance, and amplifying means inserted between said source and said compensating circuit for operating said controlling means.

19. For study of a system including electric machines and at least one electric transmission line connected therewith, a micro-system reproducing said system on a reduced scale which comprises, in combination, electric machines and at least one electric transmission line connected therewith arranged similarly to the corresponding elements of the big system, said machines of the micro-system having nominal powers such that the ratio of each of them to the nominal power of the corresponding machine of the big system has a given value, smaller than 1 and the same for all of said machines, means for giving the inertia constants of the machines of the micro-system values such that the ratio of each of them to the inertia constant of the corresponding machine of the big system is equal to the square of the ratio of the current frequencies in the micro-system and the big system respectively, means for keeping always the reactances of the electrical elements of the micro-system in the same ratio to the reactances of the corresponding elements of the big system respectively, this ratio being equal to the above mentioned given value, said last mentioned means including zero phase sequence and positive phase sequence impedances in said micro-system line in the same ratio to the respective zero phase sequence and positive phase sequence impedances of the big system line, a neutral wire for said micro-system line, an impedance in said neutral wire equal to one third of the difference between said zero phase sequence and positive phase sequence impedances of the micro-system line, a group of two sets of three capacities in parallel inserted between the wires of said micro-system line, one of said sets being connected directly to said neutral wire on one side of said impedance therein, and a similar group of capacities mounted in the same manner connected to said neutral wire on the other side of said last mentioned impedance, said capacities being proportional to the corresponding capacities of the big system in a ratio equal to said above mentioned given value, and means for giving each of said circuit elements of the micro-system including a reactance a time constant equal to the time constant of the corresponding element of the big system, said last mentioned means including an auxiliary source of external energy connected in series with said last mentioned element for introducing thereinto an electromotive force proportional to the current, means for controlling said auxiliary source, a potentiometer connected across the terminals of said source, and amplifying means inserted between said potentiometer and a point of said circuit element of the micro-system.

20. For study of a system including electric machines and at least one electric transmission line connected therewith, a micro-system reproducing said system on a reduced scale which comprises, in combination, electric machines and at least one electric transmission line connected therewith arranged similarly to the corresponding elements of the big system, said machines of the micro-system having nominal powers such that the ratio of each of them to the nominal power of the corresponding machine of the big system has a given value, smaller than 1 and the same for all of said machines, means for giving the inertia constants of the machines of the micro-system values such that the ratio of each of them to the inertia constant of the corresponding machine of the big system is equal to the square of the ratio of the current frequencies in the micro-system and the big system respectively, means for keeping always the reactances of the electrical elements of the micro-system in the same ratio to the reactances of the corresponding elements of the big system respectively, this ratio being equal to the above mentioned given value, said last mentioned means including zero phase sequence and positive phase sequence impedances in said micro-system line in the same ratio to the respective zero phase sequence and positive phase sequence impedances of the big system line, a neutral wire for said micro-system line, an impedance in said neutral wire equal to one third of the difference between said zero phase sequence and positive phase sequence impedances of the micro-system line, a group of two sets of three capacities in parallel inserted between the wires of said micro-system line, one of said sets being connected directly to said neutral wire on one side of said impedance therein, and a similar group of capacities mounted in the same manner connected to said neutral wire on the other side of said last mentioned impedance, said capacities being proportional to the corresponding capacities of the big system in a ratio equal to said above mentioned given value, and means for giving each of said circuit elements of the micro-system including a reactance a time contant equal to the time constant of the corresponding element of the big system, said last mentioned means including an auxiliary source of external energy connected in series with said last mentioned element for introducing thereinto an electromotive force proportional to the current, means for controlling said auxiliary source, a compensating circuit coupled with said reactance, amplifying means inserted between said source and said compensating circuit for operating said controlling means, and means including a reference source connected with said micro-system circuit element to permit adjustment of the current therein.

21. For study of a system including electric machines and at least one electric transmission line connected therewith, a micro-system reproducing said system on a reduced scale which comprises, in combination, electric machines and at least one electric transmission line connected therewith arranged similarly to the corresponding elements of the big system, said machines of the micro-system having nominal powers such that the ratio of each of them to the nominal power of the corresponding machine of the big system has a given value, smaller than 1 and the same for all of said machines, means for giving the inertia constants of the machines of the micro-system values such that the ratio of each of them to the inertia constant of the corresponding machine of the big system is equal to the square of the ratio of the current frequencies in the micro-system and the big system respectively, means for keeping always the reactances of the electrical elements of the micro-system in the same ratio to the reactances of the corresponding elements of the big system respectively, this ratio being equal to the above mentioned given value, said last mentioned means including zero phase sequence and positive phase sequence impedances in said micro-system line in the same ratio to the respective zero phase sequence and positive phase sequence impedances of the big system line, a neutral wire for said micro-system line, an impedance in said neutral wire equal to one third of the difference between said zero phase sequence and positive phase sequence impedances of the micro-system line, a group of two sets of three capacities in parallel inserted between the wires of said micro-system line, one of said sets being connected directly to said neutral wire on one side of said impedance therein, and a similar group of capacities mounted in the same manner connected to said neutral wire on the other side of said last mentioned impedance, said capacities being proportional to the corresponding capacities of the big system in a ratio equal to said above mentioned given value, and means for giving each of said circuit elements of the micro-system including a reactance a time constant equal to the time constant of the corresponding element of the big system, said last mentioned means including an auxiliary source of external energy connected in series with said last mentioned element for introducing thereinto an electromotive force proportional to the current, means for controlling said auxiliary source, a potentiometer connected across the terminals of said source, amplifying means inserted between said potentiometer and a point of said circuit element of the micro-system, and means including a reference source connected with said circuit element to permit adjustment of the current therein.

22. For study of a system including electric machines and at least one electric transmission line connected therewith, a micro-system reproducing said system on a reduced scale which comprises, in combination, electric machines and at least one electric transmission line connected therewith arranged similarly to the corresponding elements of the big system, said machines of the microsystem having nominal powers such that the ratio of each of them to the nominal power of the corresponding machine of the big system has a given value, smaller than 1 and the same for all of said machines, means for giving the inertia constants of the machines of the micro-system values such that the ratio of each of them to the inertia constant of the corresponding machine of the big system is equal to the square of the ratio of the current frequencies in the micro-system and the big system respectively, means for keeping always the reactances of the electrical elements of the micro-system in the same ratio to the reactants of the corresponding elements of the big system respectively, this ratio being equal to the above mentioned given value, and means for giving each of said circuit elements of the micro-system including a reactance a time constant equal to the time constant of the corresponding element of the big system, said means including an auxiliary source connected in series with said last mentioned element for introducing thereinto an electromotive force proportional to the current, means for controlling said auxiliary source, and amplifying means responsive to variations of the electromotive-force-to-current ratio in said circuit for operating said controlling means, at least one of said machines including an armature provided with large notches and narrow arms between said notches, combined with long slots opening into said notches respectively.

23. For study of a system including electric machines and at least one electric transmission line connected therewith, a micro-system reproducing said system on a reduced scale which comprises, in combination, electric machines and at least one electric transmission line connected therewith arranged similarly to the corresponding elements of the big system, said machines of the micro-system having nominal powers such that the ratio of each of them to the nominal power of the corresponding machine of the big system has a given value, smaller than 1 and the same for all of said machines, means for giving the inertia constants of the machines of the micro-system values such that the ratio of each of them to the inertia constant of the corresponding machine of the big system is equal to the square of the ratio of the current frequencies in the micro-system and the big system respectively, means for keeping always the reactances of the electrical elements of the micro-system in the same ratio to the reactances of the corresponding elements of the big system respectively, this ratio being equal to the above mentioned given value, and means for giving each of said circuit elements of the micro-system including a reactance a time constant equal to the time constant of the corresponding element of the big system, said means including an auxiliary source of external energy connected in series with said last mentioned element for introducing thereinto an electromotive force proportional to the current, means for controlling said auxiliary source, a compensating circuit coupled with said reactance, and amplifying means inserted between said source and said compensating circuit for operating said controlling means, at least one of said machines including an armature provided with large notches and narrow arms between said notches, combined with long slots opening into said notches respectively.

24. For study of a system including electric machines and at least one electric transmission line connected therewith, a micro-system reproducing said system on a reduced scale which comprises, in combination, electric machines and at least one electric transmission line connected therewith arranged similarly to the corresponding elements of the big system, said machines of the micro-system having nominal powers such that the ratio of each of them to the nominal power of the corresponding machines of the big system has a given value, smaller than 1 and the same for all of said machines, means for giving the inertia constants of the machines of the micro-system values such that the ratio of each of them to the inertia constant of the corresponding machine of the big system is equal to the square of the ratio of the current frequencies in the micro-system and the big system respectively, means for keeping always the reactances of the electrical elements of the micro-system in the same ratio to the reactances of the corresponding elements of the big system respectively, this ratio being equal to the above mentioned given value, and means for giving each of said circuit elements of the micro-system including a reactance a time constant equal to the time constant of the corresponding element of the big system, said means including an auxiliary source of external energy connected in series with said last mentioned element for introducing thereinto an electromotive force proportional to the current, means for controlling said auxiliary source, a potentiometer connected across the terminals of said source, and amplifying means inserted between said potentiometer and a point of said circuit element of the micro-system, at least one of said machines including an armature provided with large notches and narrow arms between said notches, combined with long slots opening into said notches respectively.

ROGER JACQUES ROBERT.

REFERENCES CITED

The following references are of record in the file of this patent:

UNITED STATES PATENTS

| Number | Name | Date |
|---|---|---|
| 2,301,470 | Starr | Nov. 10, 1942 |
| 2,315,649 | Parker et al. | Apr. 6, 1943 |